United States Patent [19]
Sato et al.

[11] Patent Number: 6,071,361
[45] Date of Patent: Jun. 6, 2000

[54] COPPER-BASED SLIDING MEMBER

[75] Inventors: Yoshiaki Sato; Koichi Yamamoto; Takayuki Shibayama, all of Nagoya, Japan

[73] Assignee: Daido Metal Company Ltd., Nagoya, Japan

[21] Appl. No.: 08/867,839

[22] Filed: Jun. 3, 1997

[30] Foreign Application Priority Data

Jul. 15, 1996 [JP] Japan ................................. 8-205313

[51] Int. Cl.$^7$ ..................................... C21D 3/00
[52] U.S. Cl. ............................................. 148/516
[58] Field of Search .................... 148/434, 516, 148/532; 428/553, 614, 645, 677, 675

[56] References Cited

U.S. PATENT DOCUMENTS

| | | | |
|---|---|---|---|
| 5,000,915 | 3/1991 | Shirosaki et al. | 420/479 |
| 5,346,668 | 9/1994 | Tanaka et al. | 420/485 |
| 5,543,236 | 8/1996 | Tanaka et al. | 428/614 |
| 5,582,281 | 12/1996 | Nakashima et al. | 192/107 |

FOREIGN PATENT DOCUMENTS

| | | |
|---|---|---|
| 249924 | 3/1988 | Czechoslovakia . |
| 0175632 | 3/1986 | European Pat. Off. . |
| 62-080243 | 4/1987 | Japan . |
| 5-279772 | 10/1993 | Japan . |
| 7048665 | 2/1995 | Japan . |
| 7317804 | 12/1995 | Japan . |
| 8-042572 | 2/1996 | Japan . |
| 168875 | 4/1996 | Poland . |
| 235473 | 6/1925 | United Kingdom . |

OTHER PUBLICATIONS

Kraftfahrtechnisches Taschenbuch, p. 164 (Hardness Comparison).

Reference 1 discloses a copper-based bearing in which the composition of the sliding layer consists of 10–35 wt. % of Zn, 2–20 wt. % of Pb, 1–10 wt. % of Ni, 0.1–1 wt. % of B and the balance of Cu.

Reference 2 discloses a bearing in which a sliding layer consists of 28–32 wt. % of Zn, 0.7–1.3 wt. % of Si and the balance of Cu.

*Primary Examiner*—Sikyin Ip
*Attorney, Agent, or Firm*—Browdy and Neimark

[57] ABSTRACT

A copper-based sliding member having excellent resistance to corrosion with sulfur and a Vickers hardness of 80 to 150, prepared by bonding to a backing metal layer a sliding layer comprising more than 35% by weight but not more than 43% by weight of Zn, the balance being composed of Cu, by a pressure-bonding method, subjecting the pressure-bonded assembly to diffusion-annealing and subjecting the assembly to work-hardening treatment to allow the sliding layer softened by the diffusion-annealing to have a Vickers hardness to 80 to 150. Said sliding member is excellent in resistance to corrosion with sulfur even under the conditions that a lubricating oil having a high sulfur concentration is used and also excellent in wear resistance.

5 Claims, No Drawings

COPPER-BASED SLIDING MEMBER

BACKGROUND OF THE INVENTION

This invention relates to a copper-based sliding member for a bearing or the like, and more particularly to a copper-based sliding member excellent in resistance to corrosion from a sulfur-containing lubricant.

Recently, in some cases, an additive having a high sulfur content has been added to, for example, a lubricating oil such as an engine oil or the like for the purpose of diminishing the friction between the cylinders and the pistons. When such a lubricating oil having a high sulfur concentration is used, in the case of a copper-based bearing to be used in connecting-rod or the like, the Cu phase which is the matrix of the sliding layer of the bearing tends to be preferentially corroded by the sulfur, and there has been caused such a problem that the corrosion resistance of the sliding layer is not sufficient.

A copper-based bearing whose resistance to corrosion from sulfur has been increased is disclosed in JP-A 5(1993)-279,772. In this copper-based bearing, the composition of the sliding layer is such that the Zn content is 10 to 35% by weight, the Pb content is 2 to 20% by weight, the Ni content is 1 to 10% by weight, the B content is 0.1 to 1% by weight and the balance is composed of Cu.

Moreover, JP-A 8(1996)-42,572 discloses a bearing in which a sliding layer consisting of 28 to 32% by weight of Zn, 0.7 to 1.3% by weight of Si and the balance composed of Cu is bonded to a backing metal layer composed of steel.

The present inventors have made extensive research on the relation between the zinc content in the sliding layer and the amount of the sliding layer corroded with sulfur and have consequently found that the higher the zinc content was, the lower the amount of the sliding layer corroded with sulfur became; in other words, the resistance of the sliding layer to corrosion with sulfur is enhanced by an increase of the zinc content.

However, when it is intended to sinter or cast the sliding layer having a high zinc content onto the backing metal layer, the evaporation of zinc is violent and hence there have been such problems that it becomes difficult to bond the sliding layer onto the backing metal layer and the working environment becomes bad. Therefore, the zinc content has been limited up to 35% by weight, and hence, it has been impossible to prepare a copper alloy bearing having sufficiently high corrosion resistance.

Accordingly, JP-A 5(1993)-279,772 and JP-A 8(1996)-42,572 referred to above define the zinc content as not more than 35% by weight and not more than 32% by weight, respectively. Therefore, it has been impossible to prepare a copper-based sliding member having sufficient resistance to corrosion with sulfur.

SUMMARY OF THE INVENTION

An object of this invention is to provide a copper-based sliding member excellent in corrosion resistance, particularly resistance to corrosion with sulfur, even under such conditions that a lubricant oil having a high sulfur concentration is used and also excellent in wear resistance.

Other objects and advantages of this invention will become apparent from the following description.

According to this invention, there is provided a multilayer copper-based sliding member comprising a backing metal layer and a sliding layer bonded onto the backing metal layer, wherein the composition of the sliding layer is more than 35% by weight but not more than 43% by weight of Zn and the balance composed of Cu, and the sliding layer has a Vickers hardness of 80 to 150.

DETAILED DESCRIPTION OF THE INVENTION

The backing metal layer is composed of a highly rigid steel plate, particularly desirably a cold-rolled carbon steel plate, for ensuring the strength of a sliding member, and if necessary, a stainless steel or a copper alloy can be used.

The Zn content is more than 35% by weight, but not more than 43% by weight. When it is not more than 35% by weight, the resistance to corrosion with sulfur is not sufficient, and when it exceeds 43% by weight, the sliding characteristics are remarkably deteriorated.

When a sliding layer having a Zn content of more than 35% by weight but not more than 43% by weight is bonded onto a backing metal layer by a strip casting method or a strip sintering method, the evaporation of zinc is violent, whereby it becomes difficult to bond the sliding layer onto the backing metal layer and the working environment becomes bad. Therefore, it is desirable to bond the two by a pressure bonding, particularly a roll bonding method.

The pressure bonding method comprises preferably piling the sliding layer on a plate-shaped backing metal layer at room temperature, roll-bonding the resulting assembly at a reduction rate of 35 to 50% to pressure bond the sliding layer onto the plate-shaped backing metal layer, subsequently heating the bonded assembly to 450–650° C., and subjecting the assembly to diffusion and annealing to firmly bond the sliding layer onto the plate-shaped backing metal layer.

The sliding layer becomes soft by the diffusion and annealing. When the sliding layer has a Vickers hardness of less than 80, the load carrying capacity and the wear resistance are not sufficient. Therefore, after the roll-bonding, a work hardening treatment is conducted by roll processing at a reduction rate of 3 to 30% to harden the sliding layer, whereby the Vickers hardness is adjusted to 80 to 150. Incidentally, when the Vickers hardness exceeds 150, the conformability becomes unsatisfactory.

In this invention, it is preferable to add to the sliding layer 1 to 10% by weight of Pb and/or not more than 10% by weight of at least one element selected from the group consisting of Sn, Ni, Si, Mn, Al and P.

Pb improves the seizure resistance; however, when the Pb content exceeds 10% by weight, the fatigue resistance is deteriorated. Therefore, it is desirable to add Pb in a proportion of 1 to 10% by weight.

Moreover, for strengthening the Cu matrix, it is desirable to add Sn, Ni, Si, Mn, Al, P or the like. When the content thereof exceeds 10% by weight, the sliding layer becomes brittle and the elongation thereof is lowered. Hence, the amount of the above component added is adjusted to not more than 10% by weight, preferably 1 to 10% by weight.

In this invention, it is preferable to provide an intermediate layer composed of a Cu alloy or a Ni alloy between the backing metal layer and the sliding layer, whereby the bonding strength between the backing metal layer and the sliding layer can be further increased.

As explained above, according to this invention, there is provided a multilayer sliding member excellent in resistance to corrosion with sulfur in which the composition of the sliding layer bonded onto the backing metal layer is such that the Zn content is more than 35% by weight but not more than 43% by weight and the balance is composed of Cu and the sliding layer has a Vickers hardness of 80 to 150.

DESCRIPTION OF THE PREFERRED EMBODIMENTS

Examples and Comparative Examples are shown below to explain this invention in more detail.

EXAMPLES 1 TO 9 AND COMPARATIVE EXAMPLES 1 TO 5

As a sliding layer, one of the compositions shown for Examples 1 to 9 and Comparative Examples 1 to 5 in Table 1 was molded to prepare plate-shaped molded articles having a thickness of 1 mm to be used in the Examples and Comparative Examples, respectively.

TABLE 1

| | | Composition (% by weight) | | | | | | | | | Vickers hardness Work-hardening | |
|---|---|---|---|---|---|---|---|---|---|---|---|---|
| | | Cu | Zn | Pb | Sn | Ni | Si | Mn | Al | P | Before | After |
| Example | 1 | Balance | 36 | | | | | | | | 60 | 82 |
| | 2 | " | 40 | | 3 | | | | | | 68 | 98 |
| | 3 | " | 40 | 3 | | | | | 7 | | 76 | 136 |
| | 4 | " | 36 | | | | 0.8 | 3 | 3 | | 73 | 148 |
| | 5 | " | 38 | 6 | | | 1 | 2 | | | 70 | 128 |
| | 6 | " | 36 | 5 | | 3 | | | | | 74 | 116 |
| | 7 | " | 43 | | | | | | | | 73 | 123 |
| | 8 | " | 36 | | 8 | | | | | 0.1 | 69 | 121 |
| | 9 | " | 43 | 10 | | | | | | 0.3 | 74 | 125 |
| Comparative Example | 1 | Balance | 33 | | | | | | | | 59 | 80 |
| | 2 | " | | 10 | 10 | | | | | | 74 | 85 |
| | 3 | " | | | 6 | | | | | 0.08 | 68 | 102 |
| | 4 | " | 38 | | | | | | | | 63 | 78 |
| | 5 | " | | 5 | 11 | 3 | | | | 0.1 | 74 | 130 |

A steel plate for backing metal having a thickness 2.5 mm was piled on one of the plate-shaped molded articles for sliding layer obtained above, the resulting assembly was subjected to roll-bonding at room temperature at a reduction rate of 45% to adjust the overall thickness to 1.9 mm. After this roll-bonding step, the bonded assembly was annealed at 550° C. for 60 minutes under a reducing atmosphere. By this diffusion-annealing, the sliding layer was diffused on the backing metal surface to form a multilayer product in which the sliding layer was firmly bonded onto the backing metal layer. Incidentally, in Example 5, the backing metal having a 8-μm Ni plating on its surface and in Example 9, the backing metal having a 8-μm Cu plating were subjected to the roll-bonding. The sliding layers thus obtained were subjected to measurement of Vickers hardness to obtain the results shown in Table 1. All the sliding layers had a Vickers hardness within the range of from 60 to 76 due to annealing.

The assembly thus obtained was rolled at room temperature at a reduction of 5 to 12% to be work-hardened. In the Comparative Example 4, however, the reduction rate was adjusted to 2% to allow the assembly to be lightly work-hardened. Incidentally, the overall thickness of the bearing obtained was 1.7 mm. The sliding layers obtained in this work-hardening step were subjected to measurement of Vickers hardness to obtain the results shown in Table 1. In the Examples and Comparative Examples, except Comparative Example 4, the Vickers hardness was adjusted to 80 to 150 by the work-hardening treatment. In only Comparative Example 4, the Vickers hardness was 78 which is less than 80.

The plate-shaped test specimen thus obtained in each of the Examples and Comparative Examples was curve-formed to prepare a half bearing in a half cylindrical shape having an outer diameter of 20 mm, a length of 20 mm and a thickness of 1.5 mm and this bearing was subjected to corrosion test. In the corrosion test, the test specimen was immersed for 200 hours in a diesel engine oil heated at 130° C. and whether or not the surface of the sliding layer of the bearing was discolored to black was judged by observing the appearance to obtain the results shown in Table 2.

TABLE 2

| | | Corrosion test result | Wear test result Amount of wear (μm) | |
|---|---|---|---|---|
| | | o: Not discolored X: Discolored | Without work-hardening | After work-hardening |
| Example | 1 | o | 14.1 | 8.9 |
| | 2 | o | 12.7 | 8.2 |
| | 3 | o | 10.1 | 4.5 |
| | 4 | o | 10.5 | 3.5 |
| | 5 | o | 12.3 | 5.0 |
| | 6 | o | 11.0 | 5.3 |
| | 7 | o | 11.0 | 5.2 |
| | 8 | o | 11.7 | 5.3 |
| | 9 | o | 10.5 | 5.1 |
| Comparative Example | 1 | X | 14.2 | 9.0 |
| | 2 | X | 10.7 | 8.4 |
| | 3 | X | 12.4 | 6.6 |
| | 4 | o | 14.1 | 10.0 |
| | 5 | X | 10.2 | 4.6 |

As a result, it was found that in Examples 1 Comparative Example 4 in which the Zn content was not less than 36% by weight which was more than 35% no discoloration was observed and the corrosion was excellent. On the other hand, in Comparative Example 1 in which the Zn content was 33% by weight, it was confirmed that the discoloration was caused and the corrosion resistance was not satisfactory.

In the wear test, a test specimen which had been subjected to work-hardening treatment and a test specimen which had not been subjected to work-hardening treatment were subjected to wear test under the test conditions shown in Table 3 using a wear testing machine. The difference in thickness between before and after the test was regarded as an amount of wear. The results obtained are shown in Table 2.

TABLE 3

| Test conditions | | Dimension | Unit |
| --- | --- | --- | --- |
| Test specimen dimension | | φ20 × 120 | mm |
| Peripheral speed | | 1 | m/sec |
| Pressure | | 10 | MPa |
| Lubricating oil | | SAE 30 | — |
| Lubricating oil temp. | | 55 | ° C. |
| Lubricating method | | Oil bath | — |
| Counter member | Material | S55C quenched | — |
| | Roughness | 1.0 | $R_{max}$ μm |
| | Hardness | 500–700 | Hv 10 |

In the wear test in each of the Examples and Comparative Examples before the work-hardening treatment shown in Table 2, the sliding layer was softened in the diffusion-annealing step, so that the wear became large. On the other hand, after the work-hardening treatment, all the test specimens were hardened by the work-hardening treatment, so that the wear was small. In particular, comparing Examples 1 and 7 in which a binary alloy of Cu and Zn was used, Example 7 in which the Zn content was larger was smaller in wear. Also, in Examples 2 to 6, 8 and 9 in which Sn, Ni, Si, Mn, Al or P was added to strengthen the Cu matrix, a high hardness was obtained after the work-hardening treatment, and the wear resistance was further improved. Particularly, in Example 4 in which the Zn content was 36% by weight which was the same as in Example 1, high wear resistance was obtained.

What is claimed is:

1. A process for producing a copper-based sliding member which comprises a pressure-bonding step of pressure-bonding an assembly prepared by piling, on a plate-shaped backing metal layer, a plate-shaped sliding layer comprising Zn and Cu, the Zn content being more than 35% by weight but not more than 43% by weight; a diffusion-annealing step of heating the pressure-bonded assembly to diffusion-anneal the assembly; and a work-hardening treatment step of adjusting the Vickers hardness to 80 to 150.

2. The process according to claim 1, wherein the pressure-bonding is roll-bonding.

3. The process according to claim 1, wherein the sliding layer comprises at least one of (1) 1 to 10% by weight of Pb, and (2) not more than 10% by weight of at least one element selected from the group consisting of Sn, Ni, Mn, Al and P.

4. The process according to claim 1, wherein the balance of the sliding layer is Cu.

5. The process according to claim 1, wherein an intermediate layer composed of a Cu alloy or a Ni alloy is provided between the backing metal layer and the sliding layer.

* * * * *